March 12, 1940.    A. A. CLOKEY    2,193,581
MIXING VALVE
Filed Nov. 5, 1935    3 Sheets-Sheet 1

INVENTOR.
Allison A. Clokey
BY
ATTORNEY.

March 12, 1940.　　A. A. CLOKEY　　2,193,581
MIXING VALVE
Filed Nov. 5, 1935　　3 Sheets-Sheet 2
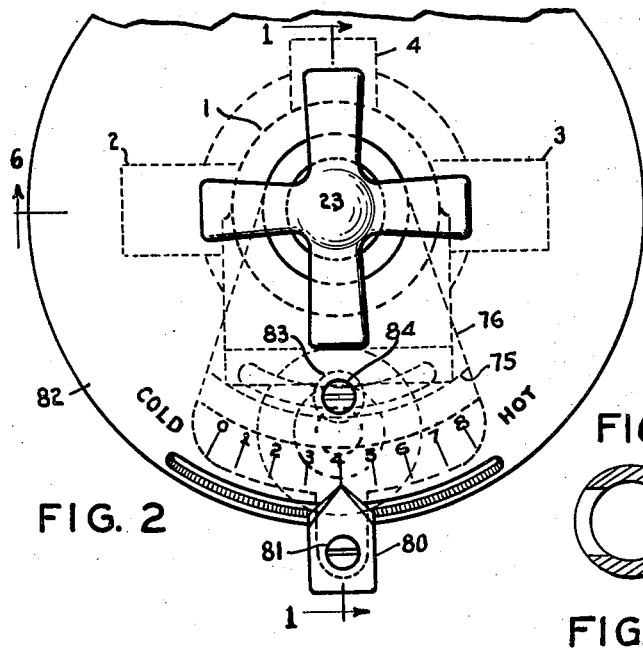
FIG. 2
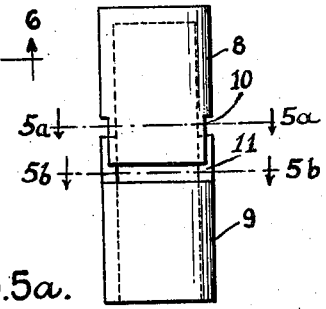
FIG. 5
FIG. 5a.
FIG. 5b.
FIG. 3
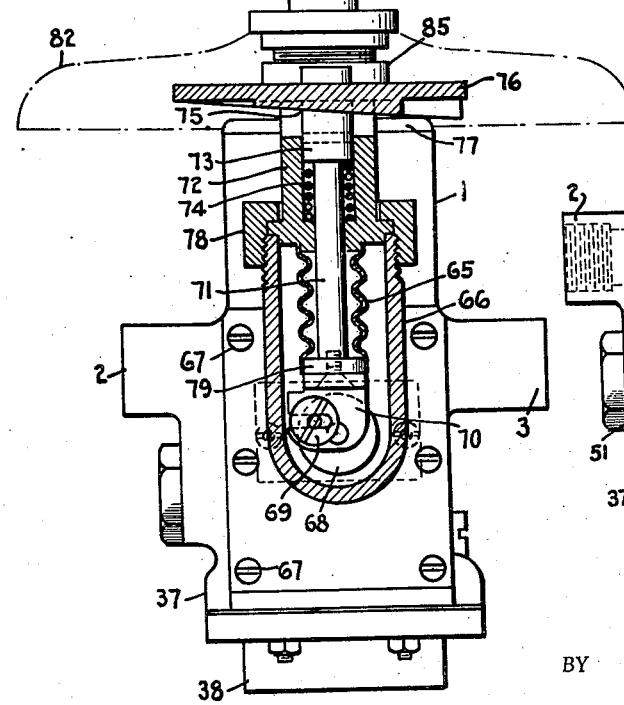
FIG. 4
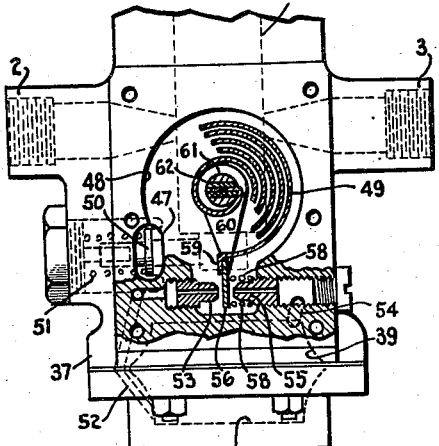
INVENTOR.
Allison A. Clokey
BY
ATTORNEY.

March 12, 1940.  A. A. CLOKEY  2,193,581
MIXING VALVE
Filed Nov. 5, 1935  3 Sheets-Sheet 3
FIG. 6
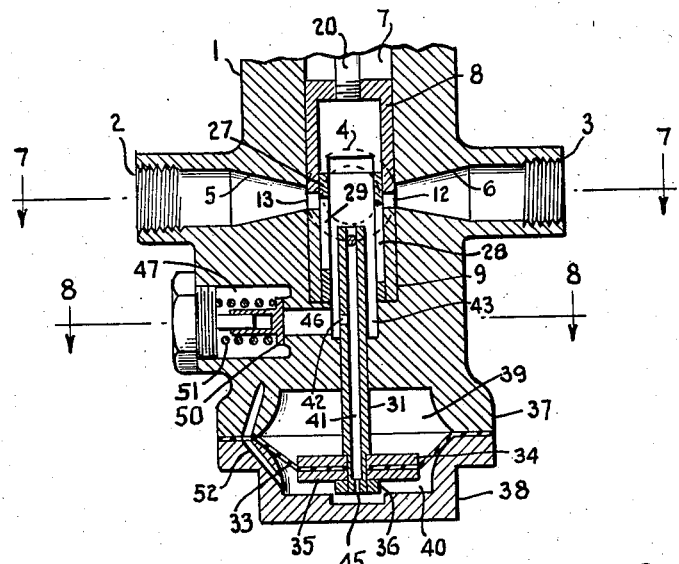
FIG. 7
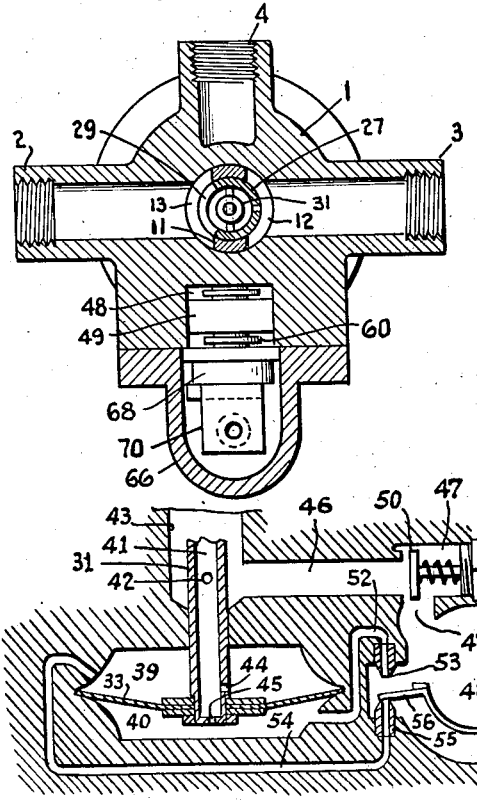
FIG. 8
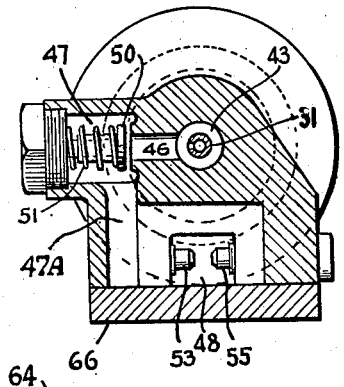
FIG. 9.
INVENTOR.
Allison A. Clokey
BY
ATTORNEY.

Patented Mar. 12, 1940

2,193,581

UNITED STATES PATENT OFFICE 2,193,581

MIXING VALVE

Allison A. Clokey, Rutherford, N. J.

Application November 5, 1935, Serial No. 48,294

10 Claims. (Cl. 236—12)

This invention relates to new and useful improvements in mixing valves or fluid flow regulators and methods of operating them.

The object of the present invention is a mixing valve whereby a desired volume of a mixture of fluids, e. g., of hot and cold water, may be delivered at the required temperature in spite of relatively great temperature and pressure changes that may occur in the fluid supplies.

In accordance with the present invention this is accomplished by varying the proportions of, e. g., hot and cold water, admitted at a sufficiently rapid rate to prevent more than negligible departures from the desired mixture temperature without permitting the occurrence of oscillations which usually arise in devices and systems which it is attempted to control within narrow limits. Preferably, the mixture is controlled by a temperature-responsive device such as a bimetallic thermostat.

In order more clearly to explain the nature of the invention a preferred embodiment thereof will be described which, however, may be varied in many respects without departing from the spirit of the invention defined in the claims.

In the drawings,

Fig. 2 is an end view of the regulator;

Fig. 3 is a cross-section along lines 3—3 of Fig. 1;

Fig. 4 is a section along lines 4—4 of Fig. 1;

Fig. 5 is a view of the water flow control valve;

Fig. 5a is a section along line 5a—5a of Fig. 5;

Fig. 5b is a section along line 5b—5b of Fig. 5;

Fig. 6 is a vertical cross-section of the lower portion of the regulator taken along lines 6—6 of Fig. 2;

Figure 1:
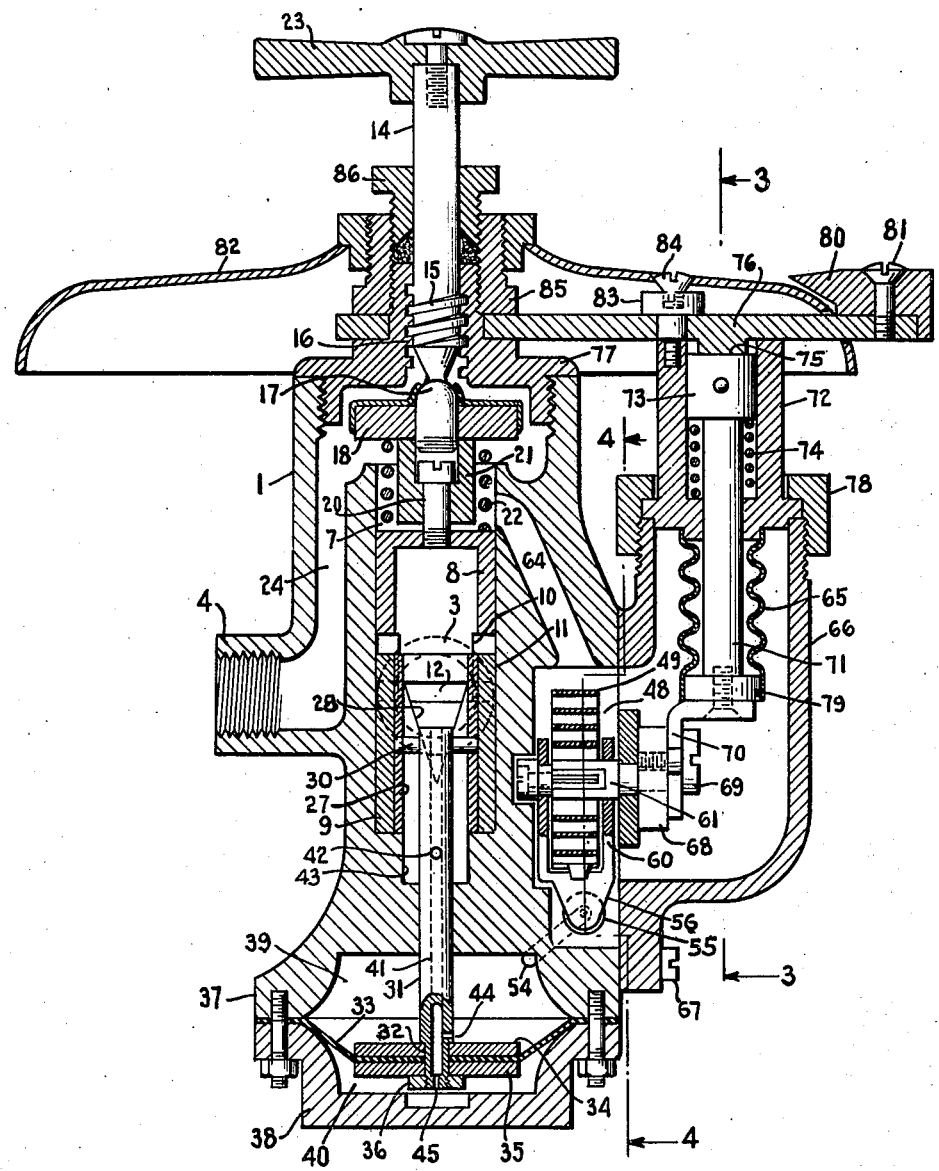
Fig. 1 is a vertical cross-section through the regulator along lines 1—1 of Fig. 2.

Figs. 7 and 8 are sections along lines 7—7 and 8—8, respectively, of Fig. 6; and Fig. 9 schematically illustrates the mixing valve and its relationship to the balance of the valve.

The main body of the regulator is indicated by the reference numeral 1 and it consists of a casting of suitable material. This casting is provided with an inlet port 2 for the hot water connection and an inlet port 3 for the cold water connection. These ports are best shown in Figs. 6 and 7, only the port 3 being indicated in dotted lines in Fig. 1. The mixture of hot and and cold water is discharged from the regulator through an outlet port 4 of the casting 1.

The inlet ports 2 and 3 form the mouths of tapering passageways 5 and 6, respectively, which open at diametrically opposite points into the mixing chamber in a central cylindrical cavity 7 of the casting 1. Within the cavity 7 are provided, positioned one above the other, two cylinders 8 and 9, each having two diametrically opposite ears such as 10 and 11 cooperating with corresponding notches in the other. The ears and notches are so positioned and shaped that when the two cylinders 8 and 9 are pushed one against the other, a smooth, sealed, cylindrical surface is presented. As the two cylinders are moved apart, four openings of gradually increasing area will be formed in the cylinder constituted by the upper and lower portions 8 and 9; two of these openings diametrically opposite one another will be formed between the recessed portions of the upper cylinder 8 and the ears 11 of the lower cylinder 9 sliding within said recessed portions, and two openings also diametrically opposite one another but below the first mentioned openings and displaced substantially 90° with respect thereto, will be formed between the recessed portion of the lower cylinder and the depending ears 10 of the upper cylinder 8. The last mentioned openings indicated at 12 and 13 are in alignment with the tapered ends of the cold and hot water passageways 6 and 5, respectively, the rectangular area of each of said openings being sufficient so that when fully opened each of them will pass the maximum volume of water that the regulator is designed to supply.

As best shown in Fig. 7, the water flowing towards openings 12 and 13 will press the depending ears 10 of cylinder 8 against slots formed by the flat sides of the ears 11 projecting from the lower cylinder 9, whereby free reciprocating movement of cylinder 8 is insured. The planes of the seats being at a suitable angle (perpendicular) to the flow of water, the two sections of the cylinder cannot bind.

The lower cylinder 9 is fixed within the cavity 7 near the bottom thereof. The upper cylinder 8 is axially movable within the cavity by means of a shaft 14, a screw-threaded portion 15 of which cooperates with an internally screw-threaded projection 16 at the top of the casting 1. The end of the shaft 14 below the screw-threaded portion 15 carries, by means of the usual ball and socket type of coupling 17, a valve 18. A headed lug fastened to the top of the upper cylinder 8 is carried within a bushing 21 held against the bottom of the valve 18 and projecting into the cavity 7. Bushing 21 serves as a means for positioning a coiled spring 22, the end of which engages the top of cylinder 8 and the upper end of which engages the valve 18.

When the shaft 14 is rotated by means of hand wheel 23 in one direction, it will cause the valve 18 and the cylindrical portion 8 to travel downward until the openings between the upper and lower cylinders 8 and 9 are closed and the valve 18 seals the upper outlet port of the cavity 7 which, through the passageway 24, communicates with the outlet port 4. When the hand wheel 23 is rotated in the opposite direction, first the spring 22 will force open the valve 18 and then when the latter is opened, will permit the gradual pulling up of the cylinder portion 8 to admit, through the openings 12 and 13, a gradually increasing supply of hot and cold water into the mixing chamber within the cylinders 8 and 9 from whence the water will flow in a manner to be presently described, through passageway 24, to the outlet port 4.

Within the cylindrical bore of the upper and lower cylinders 8 and 9 is a longitudinally displaceable mixing valve sleeve 27 which in Fig. 5 is shown removed from cylinders 8 and 9. The mixing valve 27 is provided with two diametrically opposite and oppositely pointed substantially triangular openings 28 and 29. These openings are so located that when the mixing valve 27 occupies its extreme lower position, the cold water inlet 12 that may be formed between cylinders 8 and 9 will be open and the hot water inlet 13 will be completely closed. When the mixing valve 27 is at its extreme upper position the opposite condition obtains, because the triangular opening 29 will free the hot water inlet 13 and the cold water inlet 12 will be closed, the apex of the triangular opening 28 being past the cold water inlet. The triangular openings 28 and 29 are so shaped that any movement of the mixing valve 27 will cause an increase in the volume of fluid admitted by one of the inlets 12 or 13 which is proportional to the displacement of the mixing valve 27 and will simultaneously produce an equal decrease in the volume of liquid admitted by the other inlet, thus causing the volume of the combined flow from both the hot and cold water inlets to be the same (at any given pressure) for all positions of the mixing valve 27 at any given setting of the cylinder 8, i. e., of the volume control wheel 23.

Owing to this arrangement the total volume of water flowing from the hot and cold sources of supply will be unaffected by any changes made in the proportions of hot and cold water. If this condition were not observed the total volume of water flowing would vary with the proportions of hot and cold water being passed by the mixing valve and the time required for water to travel between that point and the thermostat (to be presently described), would consequently be different at different temperatures. The effect of this is to reduce the rapidity at which temperature variations can be corrected without the possibility of starting oscillations of the mixing valve. Furthermore the complementary changes in the volume of hot and cold water will be the same for equal movements of the mixing valve in any portion of its entire range of movement so that the distance the mixing valve will have to move to effect a given change in the temperature of the discharge and the time required to complete such movement will be always the same (at any given pressure) throughout the travel of the mixing valve.

Owing to the fulfillment of these conditions, in my structure the rate of correction will be fast enough at all points within the temperature range of the mixer to compensate for fortuitous changes in temperature and/or pressure of either or both the hot and cold water supplies, and thereby avoid objectionable temperature variations in the mixture.

It should be noted at this point that where a cylindrical valve controller operates between two circular orifices through which the hot and cold water supplies are admitted to a mixing chamber, a given movement of the valve piston when near one or the other limits of its travel produces unequal changes in the volumes of water flowing through the two inlets. These changes are greater for a given movement of the valve when near one or the other of its limits of travel than when the valve occupies a position more nearly midway between the hot and cold inlets. Where the volume of flow is controlled by means of shut-off valves located in the discharge pipe, when such valve is partially shut to reduce the volume of discharge, the last-mentioned drawback is further accentuated.

The mixing valve 27 is connected by means of a wristpin 30 held in perforations provided in the side walls of valve sleeve 27 and fastened to the end of a connecting rod 31. The lower end of connecting rod 31 is recessed as indicated at 32 and this recessed portion passes through a flexible diaphragm 33 clamped between two plates 34 and 35, also seated on the recessed portion 32, the assembly being held tightly in position by means of a nut 36 engaging the screw-threaded end of connecting rod 31. The edge of diaphragm 33 is clamped against a lower flange 37 of the casting 1 by means of a housing 38, and divides the cavity formed between the casting 1 and the housing 38 into an upper and a lower piston chamber 39 and 40.

The connecting rod 31 is axially perforated, the axial passageway being indicated at 41. A radial perforation 42 through the side wall of the connecting rod 31 communicates with lower recessed portion 43 of cavity 7 in the casting. Another radial perforation 44 through the connecting rod 31 permits communication between the axial passageway 41 and the upper piston chamber 39. The lower end of the axial bore 41 is formed into a port 45 which communicates with the lower piston chamber 40.

As best shown in Figs. 4, 6 and 8, water from the mixing chamber extension 43 flows through passageway 46 and 47 into a thermostat chamber 48 formed in the casting 1. The chamber 48 encloses a temperature responsive means such as a bimetallic thermostat 49. In the passage 46, 47 a valve 50 is provided and is held in place by means of a spring 51. The function of valve 50 is to maintain a difference in pressure between the chamber 43 forming part of the mixing chamber and the thermostat chamber 48.

The lower piston chamber 40 is connected through a passageway 52 formed in the housing 38 and the flange 37 of the casting with a nozzle 53, and the upper piston chamber 39 is connected through a passageway 54 with a nozzle 55. The two nozzles 53 and 55 are provided in the thermostat chamber 48 and have openings which are somewhat larger than the openings 44 and 45 through which water is discharged from the axial bore 41 into the upper and lower piston chambers 39 and 40. One or the other of nozzles 53 and 55 may be closed by a valve lever 56 which is normally pressed against the nozzle 53 by means of a spring 58 mounted on the nozzle 55. The valve lever 56 may be moved by the bent end 59 of the thermostat 49, an extension 60 of valve lever 56 being loosely mounted on shaft 61 of the thermostat. The valve lever 56 is moved against the tension of the spring 58 to close the opening of the nozzle 55 when the temperature of the fluid in the thermostat chamber 48 increases.

The thermostat 49 is rigidly mounted on a shaft 75

61 with which it may be angularly positioned by means of a crank to correspond to any desired temperature setting. The thermostat is separated from the shaft 61 by some suitable insulating material 62 in order to make its response as nearly as possible dependent upon the temperature of the surrounding water and independent of the rate at which heat is absorbed by or dissipated from adjacent metallic parts.

From the thermostat chamber 48 water flows through passageway 64 (Fig. 1) in the casting into the part of the cavity 7 above the cylinder 8, then past the shut-off valve 18 and through the passageway 24 to the discharge port 4. The top of the upper cylinder 8 is closed in order to prevent any appreciable flow direct from the mixing chamber enclosed by cylinders 8, 9 into the discharge outlet 24.

As above stated, the spring 22 allows the volume control valve constituted by the upper and lower cylinders 8 and 9 to close before the shut-off valve 18 closes and allows this volume control valve to open after the shut-off valve 18 has opened. This prevents the shut-off valve 18, which is intended solely for shutting off the outflow, from having any appreciable control over the volume of flow through the port 4, this flow being determined almost exclusively by the relative positions of cylinders 8 and 9.

In order to avoid frequent adjustments which are required when stuffing boxes are used, the control of the thermostat 49 is effected from a point outside of the main body of the regulator. This is accomplished by means of a metallic bellows 65 contained in a housing 66 secured to the casting 1 by means of bolts 67. Rigidly fastened to the thermostat shaft 61 is a disc 68 which, together with a shoulder screw 69, forms the crank by means of which the thermostat may be rotated through a small arc. Cooperating with this crank is a slotted member 70 fastened to the lower end of a plunger 71. The plunger passes through a guide bushing 72 and the bellows 65 and carries at its upper end a cam follower 73 which is held by means of a spring 74 against an inclined surface 75 of a sector 76. The sector 76 is rotatably mounted on a cap 77. The bushing 72 is screwed to the housing 66 by means of a sleeve nut 78 and the bellows 65 is soldered at one end to the bushing 72 and at the other end to the enlarged lower end 79 of the plunger 71 so as to form a water-tight seal which will withstand pressure normally used in commercial water supply systems.

A pointer 80 which is fastened to the sector 76 by means of a screw 81 cooperates with a scale marked on a cover plate 82 to indicate the setting required for any desired temperature or discharge. A shoulder screw 83 and a fastening screw 84 serve, respectively, to retain and guide the sector 76 and to hold the cover plate 82 in place. Bushing 85 and a nut 86 form a stuffing box which prevents the escape of water around the valve stem 14 when the valve 18 is opened.

In describing the operation of the regulator we shall assume that the thermostat 49 and all parts of the regulator are at room temperature and that water of a higher temperature is desired. The pointer 80 is moved to a point on the scale marked on the cover plate 82 which corresponds to the required temperature. This will move the sector 76 so that a lower point on its sloping surface 75 is opposite the cam follower 73 which moves therefor upward under the pressure of spring 74. This will cause the movement of the plunger 71 upward and will cause through the agency of the slotted member 70 the rotation of the disc 68 and of the thermostat 49 in a clockwise direction, whereby the bent end 59 of the thermostat will move away from the valve lever 56. The spring 58 will therefore be free to press the valve lever 56 against the nozzle 53, stopping the flow of cold water through the latter.

The shut-off valve handle 23 is now turned to produce the desired volume of flow through the outlet port 4. First the valve 18 will rise from its seat constituted by the upper end of the cavity 7, the spring 22 continuing to hold the volume control valve 8 in its closed position until the bushing 21 pulls against the shoulder of pin 20. Further turning of the handwheel 23 will open the volume control valve 8 to any desired extent.

Water will begin to flow from the hot water supply 2 and cold water supply 3 through the tapering passageways 5 and 6 and the apertures 12 and 13 formed between the volume control cylinders 8 and 9, the ratio of the hot and cold water flow being determined by the position of the mixing valve 27. From here the water flows to the inside of the chamber formed by the cylinders 8 and 9 and chamber 43, the pressure valve 50 and passageways 47 and 47A to the thermostat chamber 48, and thence through 64, 7, 24, to the discharge port 4, as previously described. Water also flows from the extension 43 of the mixing chamber and through opening 42 into the axial bore 41 of the connecting rod and then through the apertures 44 and 45 into the upper and lower piston chambers 39 and 40, respectively.

Since the thermostat valve closing lever 56 is held firmly against the cold water nozzle 53 by a spring 58, no water can flow out through this nozzle from the lower piston chamber 40. The hot water nozzle 55 being unobstructed, water flows from the upper piston chamber 39 and the passageway 54 into the thermostat chamber 48. The pressure in the lower piston chamber 40 will be approximately the same as in the mixing chamber and the pressure in the upper chamber 39 will be approximately the same as the pressure in the thermostat chamber 48. This difference in pressure as determined by the valve 50 will cause the diaphragm 33 to move upward and push the connecting rod 31 and the mixing valve 27 up, so as to reduce the volume of cold water flow and increase the volume of hot water flow.

As the temperature of the water flowing through the thermostat chamber 48 rises on account of the upward movement of diaphragm 33, the bent end 59 of the thermostat moves in a counter-clockwise direction until it pushes the valve lever 56 away from the cold nozzle 53, thus allowing water to flow therefrom. This flow will equalize the pressure in the upper and lower chambers 39 and 40, stopping the motion of the diaphragm 33 and therefore of the mixing valve 27. The positions of the mixing valve 27, of the thermostat 49 and of the valve lever 56 will thereafter remain unchanged and maintain a constant relation between the volumes of hot and cold water flowing while the temperatures and pressures of both the hot and cold supplies connected with inlet ports 2 and 3 remain unchanged.

Should the temperature of the hot water supply drop due to any cause whatever, or the pressure of the hot water supply become reduced, due to the opening of a faucet elsewhere in the piping system, thereby reducing the amount of hot water flowing through the mixing valve 27, the thermostat 49 will respond to the resultant change in temperature of the mixture by moving away from the valve lever 56 which, under the control of spring 58, again closes the cold nozzle 53 and causes diaphragm 33 to move the mixing valve 27 upward. This will further reduce the volume of cold water and increase the volume of hot water flowing into the mixing chamber. As in the previous case, this movement will be stopped as soon as the mixture flowing through the thermostat chamber 48 attains the temperature which the thermostat is set to maintain.

In a similar manner any increase in the temperature of hot water supply or any drop in the pressure of the cold water supply, either or both of which would result in raising the temperature of the mixture, will cause the thermostat 49 to close the hot nozzle 55. This will increase the pressure in the upper chamber 39 and cause diaphragm 33 to move the mixing valve 27 downward. The volume of hot water admitted to the mixing chamber will now be reduced and the volume of cold water flow will be increased until the temperature of the mixture returns to the predetermined value and restores thermostat 49 to its normal position in which the valve lever 56 is midway between the nozzles 53 and 55.

It will be evident from the above that the mixing valve 27 may at one time or another occupy any position within its limits of travel for any given thermostat setting, this position being dependent upon the relative temperatures and pressures of the hot and cold water supplies. There is no fixed relationship between the positions of the thermostatic element and the mixing valve and the latter may therefore move to and stop at the position which gives the proper proportions of hot and cold water needed to bring the mixture to the predetermined temperature. Without such arrangement the greater the variation in the temperature or pressure of hot and cold supplies, the greater will be the variation in the temperature of the mixture. Mixing valves using vapor pressure or bellows types of thermostats or rugged bimetallic thermostats for the purpose of directly controlling the mixing valve through a mechanical coupling fail in this respect, because a thermostat can occupy only one position for any given temperature and when it is directly coupled with the mixing valve the latter can also occupy only one position for any given temperature. Such structures provide therefore only a partial compensation for changes in the temperatures or pressures in the hot or cold water supplies. Such partial compensation is not satisfactory because at or near the normal body temperature the human body is sensitive to temperature changes as small as 2 or 3° F., and temperature changes much greater than this may result in considerable discomfort.

When the thermostat 49 returns the valve lever 56 to its normal position intermediate the two nozzles 53 and 55 and stops the motion of the mixing valve 27, after making a correction to increase the volume of hot water flow, the water at the mixing valve will be at a higher temperature than the water in the thermostat chamber 48, because a small but appreciable time is required for the water to flow between these two points. On account of this condition the thermostat 49 will continue to move the valve lever 56 beyond its mid position. If the space separating the two nozzles 53 and 55 is too narrow, or if the rate at which the mixing valve 27 travels is so fast in relation to the speed of water flow as to produce too great difference in temperature between the water at the mixing valve and the water in the thermostat chamber, then even after the mixing valve stops, the temperature of water flowing through this thermostat chamber 48 will continue to rise a sufficient amount to cause the movement of lever 56 far enough beyond its mid position to close the nozzle 55. This will cause the diaphragm 33 to move the mixing valve 27 in the opposite direction and produce a corresponding change in the temperature of the water. If the same relationship still obtains between the speed of the mixing valve travel, the nozzle spacing and the speed of the water flow, then the valve lever 56 will again overshoot the midpoint of its travel and close the nozzle 53. The mixing valve will thus continuously oscillate and produce a cyclic fluctuation in the temperature of the discharge water. The rate at which the mixing valve 27 changes the temperature of the mixture does not exceed the quotient of the number of degrees by which the temperature of the mixture must change to cause the thermostat to stop the mixing valve movement and start it in the opposite direction, and the time required for the water to flow from the mixing valve to the thermostat 49 and bring the temperature of the latter to the new temperature of the liquid. Otherwise, the mixing valve would oscillate and cause the temperature of the mixture to fluctuate between intolerable limits.

The triangular openings 28 and 29 are coextensive over the range of movement of cylinder 27 which is used for mixing. Any further movement of cylinder 27 after one part is shut merely changes the volume slightly but not the temperature of the mixture, for one supply has already been shut off. In the range of the movement of cylinder 27 used for mixing the relationship that the sum of the areas of the two inlet ports is a constant holds good.

Referring now to Fig. 9 in which the mixing valve is shown schematically, with a given thermostat 49 and a given adjustment of the distance between the nozzles 53 and 55, a definite temperature change of, say, T degrees is required to cause the end of thermostat 49 to move from nozzle 53 to nozzle 55 or vice versa.

When the end of thermostat 49 closes nozzle 55 the cylinder 27 is moved downward by the diaphragm motor at a definite constant speed. This constant speed is determined by the adjustment of the constant pressure difference between the mixing chamber and the thermostat chamber by means of the valve 50.

The cylinder 27 carries the opposed triangular openings 28 and 29. These triangular openings cooperating with narrow slots to produce the narrow rectangular cold and hot water inlets 12 and 13, respectively.

When a narrow rectangular inlet orifice controls the flow from a pipe of much larger cross-sectional area the volume of flow, under a given pressure, is directly proportional to the area of the inlet orifice.

Starting from any position of cylinder 27, over the range of movement of cylinder 27 used in mixing, any given movement of cylinder 27 increases the area of one inlet by a definite amount and simultaneously reduces the area of the other inlet by the same amount.

At any position of cylinder 27, over the mixing range, the sum of the areas of the two inlet ports is therefore constant and, as the total volume of flow of the mixture is controlled at these inlets, the volume remains constant over the mixing range, at a given pressure, being determined solely by the width of the slot.

Because a given movement of the cylinder 27, from any given position, increases the area of one inlet port by a definite amount and decreases the area of the other inlet port by the same amount, and therefore increases the hot supply and decreases the cold supply by a definite amount, or vice versa, this given movement of cylinder 27 will increase or decrease the temperature of the mixture by a definite amount.

Therefore, when the thermostat 49 closes one nozzle 53 or 55, in order to control the temperature of the mixture the constant speed of the cylinder 27 in conjunction with definite change in temperature for a given movement of cylinder 27 causes the temperature of the mixture to change at a constant rate.

An explanation will now be given of the conditions that must be met in order to change and therefore control the temperature of the mixture at the greatest possible rate without oscillation. This is necessary in order to obtain a satisfactory control of the temperature of the mixture when the temperature or pressures of the hot and cold water supplies are subject to rapid fortuitous changes.

I have discovered and it will be evident from the above description that in this case, on the edge of oscillation, the following relationship holds; the rate of change of temperature of the mixture at the inlet ports caused by the movement of mixing valve cylinder 27 is equal to the quotient of the temperature change required to move the thermostat end from one nozzle to the other divided by the time required for a temperature change at 12 or 13 to be communicated to and affect the thermostat 49. Both these equalities are ratios of temperature changes to time and may be expressed as:

$$\frac{T}{t} = \frac{T_1}{t_1}$$

where $T$ = degrees change in temperature of the mixture at 12 and 13 produced by movement of mixing valve cylinder 27 under control of the thermostat.

$t$ = time in seconds to cause the change $T$.

$T_1$ = degrees change in temperature of thermostat required to move its end from nozzle 55 or vice versa.

$t_1$ = time required for any given change in temperature occurring at 12 or 13 to reach and affect the thermostat 49.

If $$\frac{T}{t}$$

is greater than $$\frac{T_1}{t_1}$$

oscillations will result so that for non-oscillatory correction $$\frac{T}{t}$$

must be equal to or less than $$\frac{T_1}{t_1}$$

To secure faithful operation of the device after it is installed, certain precautions must be taken in the designing and assembling of the valve. Certain relationships that must be established between the parts when the valve is assembled will now be explained in detail.

By properly proportioning the size of the apertures in nozzles 53 and 55 and the size and shape of the valve lever 56, the rate of travel of diaphragm 33 and mixing valve 27 is caused gradually to decrease as the valve lever 56 approaches either of the nozzles. This causes the rate of change of water temperature at the mixing valve 27 to decrease slowly without any abrupt stoppage. This arrangement permits corrections of temperature variations more rapidly than would otherwise be possible without causing untimely oscillations of mixing valve 27.

The oscillation of the mixing valve can be guarded against by adjusting the pressure of spring 51, to produce the pressure difference between the mixing and thermostat chamber necessary to cause diaphragm 33 and mixing valve to move at the desired rate. The oscillation of the mixing valve can be controlled also by decreasing the size of the apertures in nozzles 53 and 55 or of the openings 44 and 45 discharging into the upper and lower piston chambers 39 and 40, or by a combination of both expedients. In this manner the rate at which water is admitted to and discharged from the piston chambers may be regulated until the diaphragm 33 and mixing valve 27 move at the desired rate.

The passageways between the portion of the mixing chamber which is contained within the cylinder 8 and the recess 43 and the thermostat chamber 48 must be so designed and proportioned as to make the combined lengths of these passages as short as possible and to reduce the volume of water contained therein to the lowest practical value in order to reduce to a minimum the time required for any change in temperature produced by mixing valve 27 to be communicated to the thermostat 49. Otherwise the longer time required for the water contained in these passages to flow to the thermostat would reduce the rapidity with which temperature corrections could be made without setting the mixing valve 27 into oscillation.

Oscillations of the mixing valve can be avoided also by increasing the separation of the nozzles 53 and 55 in order to allow lever 56 moderately to overshoot without closing one or the other of the valves, and by using a thermostat having the proper movement per degree of change in temperature. The thermostat should contain as little metal as is consistent with the pressure necessary to overcome the tension of spring 58 so that its response to small changes in temperature may be as rapid as possible.

The distance covered by the free end 59 of the thermostat 49 per degree of temperature change and the distance separating the nozzles 53 and 55, less the thickness of valve lever 56, determine the magnitude of temperature variation necessary to cause a response of the regulator. Too great a separation of the nozzles for a given thermostat sensitivity will cause excessive variation in the temperature of the mixture, and too close a spacing of the nozzles will cause oscillations of the mixing valve. The nozzle spacing and thermostat sensitivity must be so chosen as to cause the valve to operate and quickly to compensate for any variation in the supply which would cause the mixture to vary by 1 or 1½° F. above or below the temperature corresponding to the thermostat setting. The adjustments above referred to must be secondary to this requirement.

Should the cold water supply fail completely, the temperature of the water passing through the thermostat chamber 48 will rise gradually until all the cold water has cleared from the mixing chamber and the connecting passages. After this the temperature of the discharge will rise rapidly. The first rise in the temperature is sufficient to cause the thermostat 49 to close nozzle 55. The diaphragm 33 and mixing valve 37 will therefore move to their extreme lower position in which all flow of hot water is shut off. This action takes place so quickly as to cause complete stoppage of the hot water flow before the temperature of the discharge reaches a value that would be dangerous. Similarly, failure of the hot water supply will cause valve lever 56 to close nozzle 53, entirely shutting off the cold water supply by causing diaphragm 33 and the associated mixing valve 27 to rise to the top position.

What I claim is:

1. In a mixing valve for hot and cold water, an inlet passageway for the hot and an inlet passageway for the cold water, a mixing chamber for the hot and cold water, a valve for controlling the flow from said passageways into said chamber, means for operating said valve, an outlet passageway leading towards said mixing chamber, a second valve in said outlet passageway connected with said means for operating the first mentioned valve, and an elastic member interconnecting said valves, whereby in response to the operation of said means said valves will be successively actuated.

2. In a mixing valve for hot and cold water, an inlet passageway for the hot and an inlet passageway for the cold water, a mixing chamber for the hot and cold water comprising a cylinder divided into two sections, means for reciprocating one section with respect to the other for varying the flow of water from said passageways into the mixing chamber, an outlet passageway leading towards said mixing chamber, a valve in said outlet passageway connected with said means for reciprocating, and an elastic member interconnecting said valve and said one section of the cylinder, whereby in response to the operation of said means for reciprocating said one section and said valve will be successively actuated.

3. In a mixing valve for hot and cold water, an inlet passageway for the hot and an inlet passageway for the cold water, a mixing chamber, volume control valves between the mixing chamber and the hot and cold water passageways, said valves being interconnected, and a second valve having two oppositely pointed substantially triangular openings in alignment with the first mentioned valves, for a given movement of the second valve the change in the exposed area of one opening being equal to the change in the exposed area of the other opening.

4. In a mixing valve for hot and cold water, an inlet passageway for the hot and an inlet passageway for the cold water, a mixing chamber for the water comprising a cylinder divided into two sections interlocking by means of ears in the first section engaging recesses in the second section, one recess being in alignment with the hot and the other recess with the cold water passageway, the seats for the ears being in planes substantially at right angles to the flow of water, means for axially moving the cylinder sections with respect to one another, a sleeve within said cylinder and having two oppositely pointed substantially triangular openings in alignment with said recesses, and means for axially moving said sleeve within said cylinder, whereby the opening formed between one ear and cooperating recess will be progressively obstructed as the opening formed between the other ear and cooperating recess is freed and the water flowing through the two openings into the mixing chamber is varied uniformly and in inverse ratio throughout the movement of said sleeve.

5. In combination, a mixing valve for hot and cold water, means including a water volume control valve for maintaining at all volumes of water flow a linear relation between the rate of travel of said mixing valve and the rate of temperature change produced thereby, and means forming part of the mixing and control valves to vary the areas of hot and cold water inlets.

6. The combination defined in claim 5 and in which said first mentioned means includes also means for maintaining a substantially constant pressure difference for actuating the mixing valve.

7. The combination defined in claim 5 and in which the hot and cold water are discharged into a mixing chamber, said first mentioned means includes also a thermostat for controlling the operation of said mixing valve, a thermostat chamber in which said thermostat is located, a passageway through which said thermostat chamber communicates with said mixing chamber, and a valve in said passageway for maintaining a substantially constant pressure difference between the mixing and thermostat chambers.

8. In a mixing valve having hot and cold fluid inlets, a mixing chamber, a first valve interposed between said hot and cold fluid inlets and said mixing chamber and which exposes equal areas of the inlets, a temperature responsive device located in the path of the mixture, an outlet passageway for conveying the mixed fluid from said mixing chamber, a second valve cooperating with said first valve so that equal movements of said second valve will vary the flow of hot and cold fluid through said first valve by equal amounts but in the opposite sense throughout the entire range of movement of said second valve, a third valve between said mixing chamber and said temperature responsive device for maintaining a substantially constant difference in pressure therebetween, a first and second diaphragm chamber, a flexible wall separating said chambers, passageways for admitting fluid from said mixing chamber to said first and second diaphragm chambers, a rod connecting said flexible wall with said second valve, there being outlets from said diaphragm chambers to the low pressure side of said third valve, and means actuated by said temperature responsive device for controlling the flow of fluid from said outlets to position said second valve.

9. In a mixing valve having hot and cold fluid inlets, a mixing chamber, a first valve interposed between said hot and cold fluid inlets, a temperature responsive device located in the path of the mixture, an outlet passageway for conveying the mixed fluid from said mixing chamber, a second valve cooperating with said first valve so that equal movements of said second valve vary the flow of hot and cold fluid through said first valve by equal amounts but in the opposite sense throughout the entire range of movement of said second valve, a third valve between said mixing chamber and said temperature responsive device for maintaining a substantially constant difference in pressure therebetween, a fluid pressure motor to operate said second valve, passageways for admitting fluid from said mixing chamber to said fluid pressure motor, fluid outlets from said fluid pressure motor to the low pressure side of said third valve, and means actuated by said temperature responsive device for controlling the fluid flow from said outlets to position said second valve.

10. In combination, a mixing valve for hot and cold water, means including a water volume control valve for maintaining at all volumes of water flow and under variable hot and cold water pressure conditions a substantially uniform linear relation between the rate of travel of said mixing valve and the rate of temperature change produced thereby, and means forming part of the mixing and control valves to vary the areas of hot and cold water inlets.

ALLISON A. CLOKEY.